Dec. 4, 1945.  B. HENRICKSEN  2,390,302
CONVEYER
Filed June 2, 1943   6 Sheets-Sheet 1
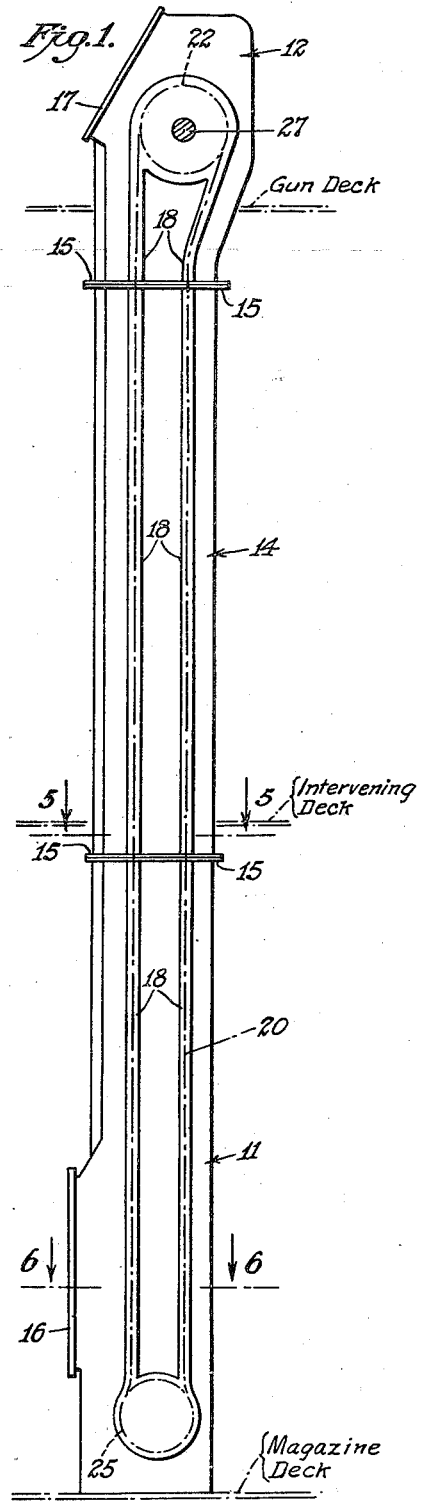
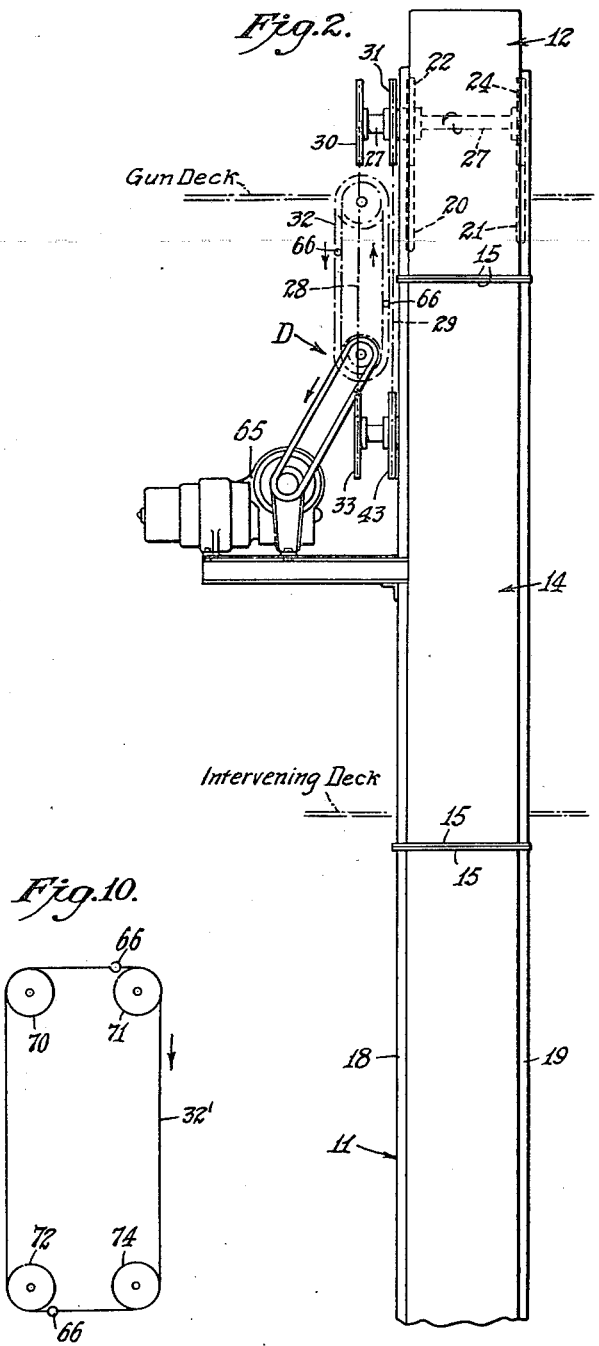
INVENTOR
Bjarne Henricksen
BY
Ramsey, Kent + Chisholm
ATTORNEYS

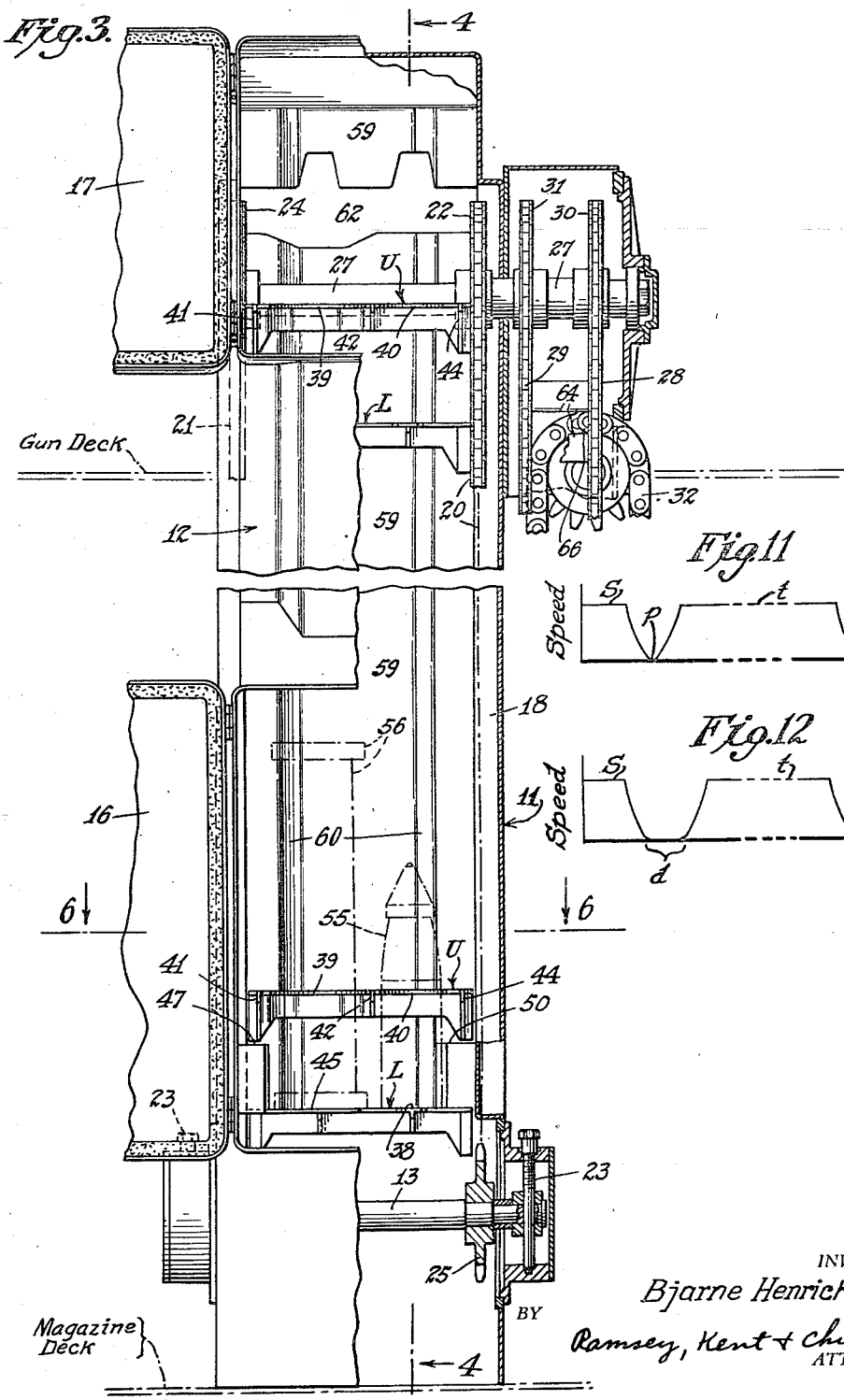

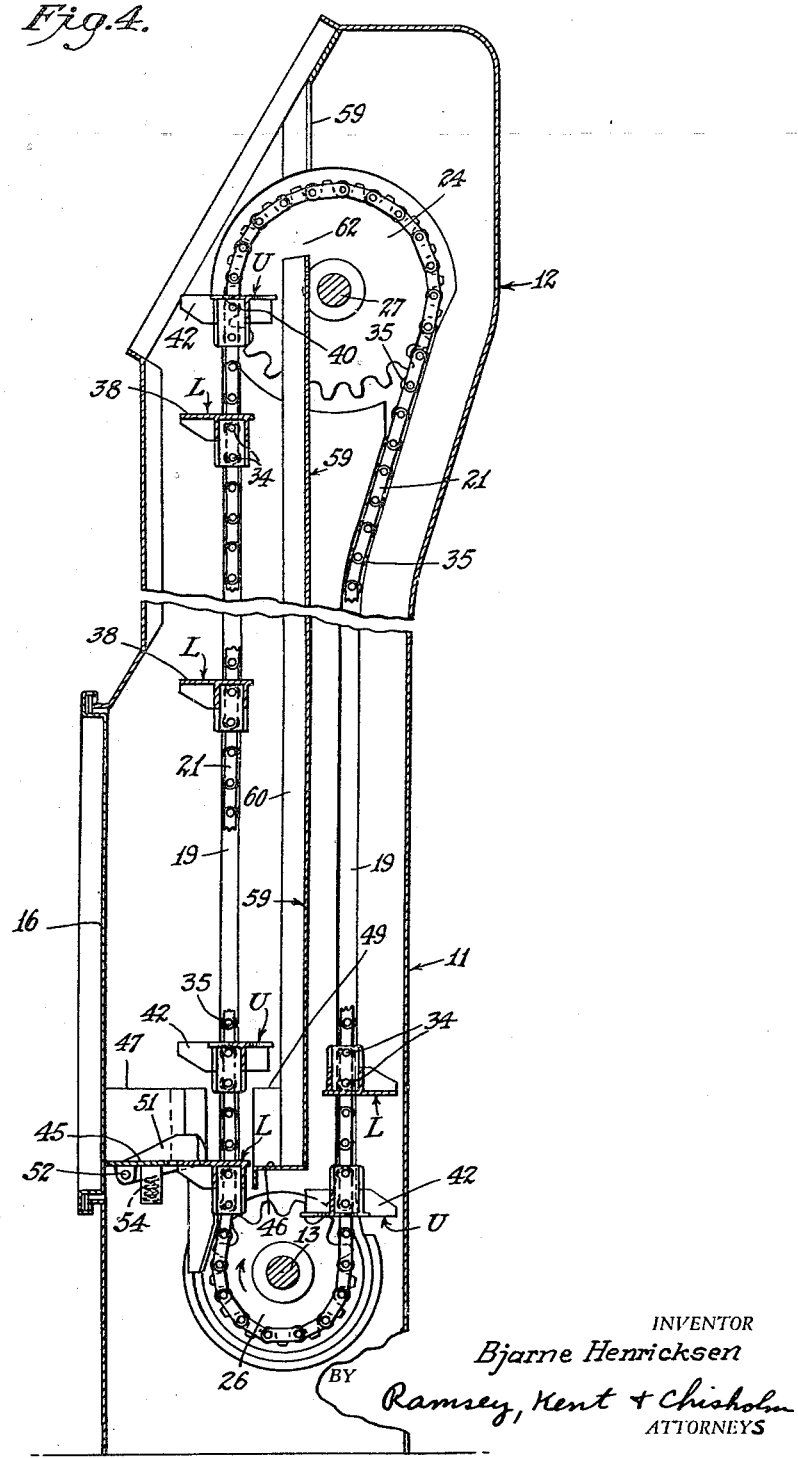

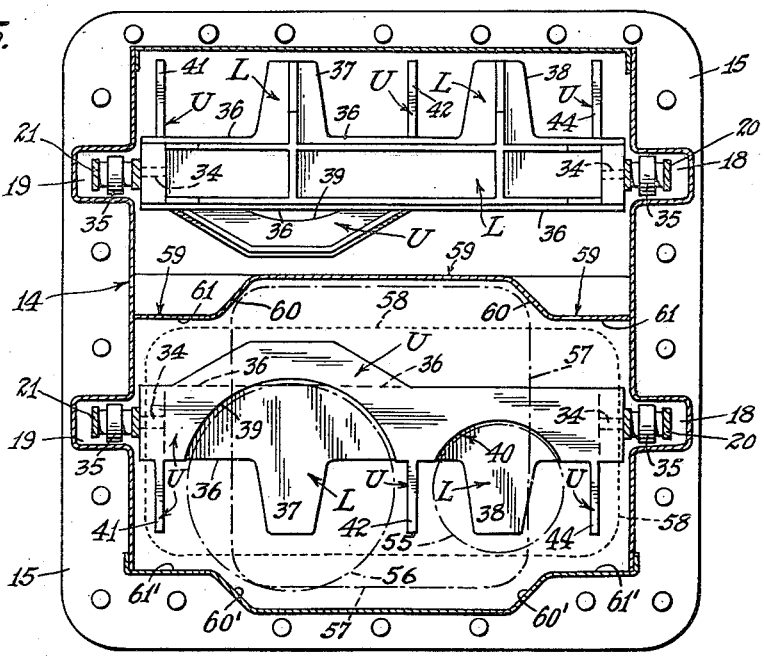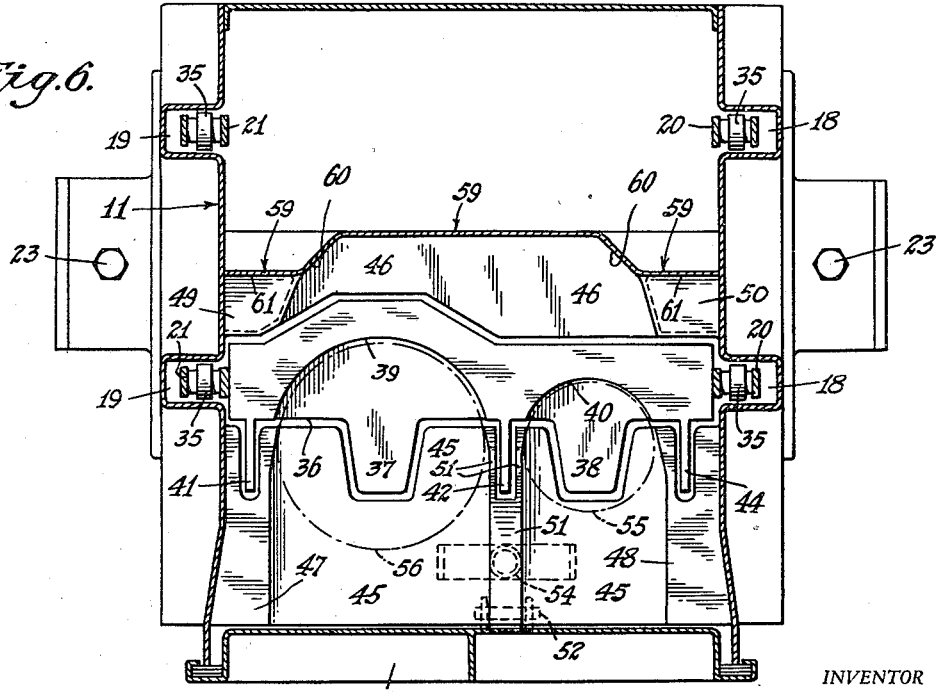

Dec. 4, 1945.  B. HENRICKSEN  2,390,302
CONVEYER
Filed June 2, 1943  6 Sheets-Sheet 5
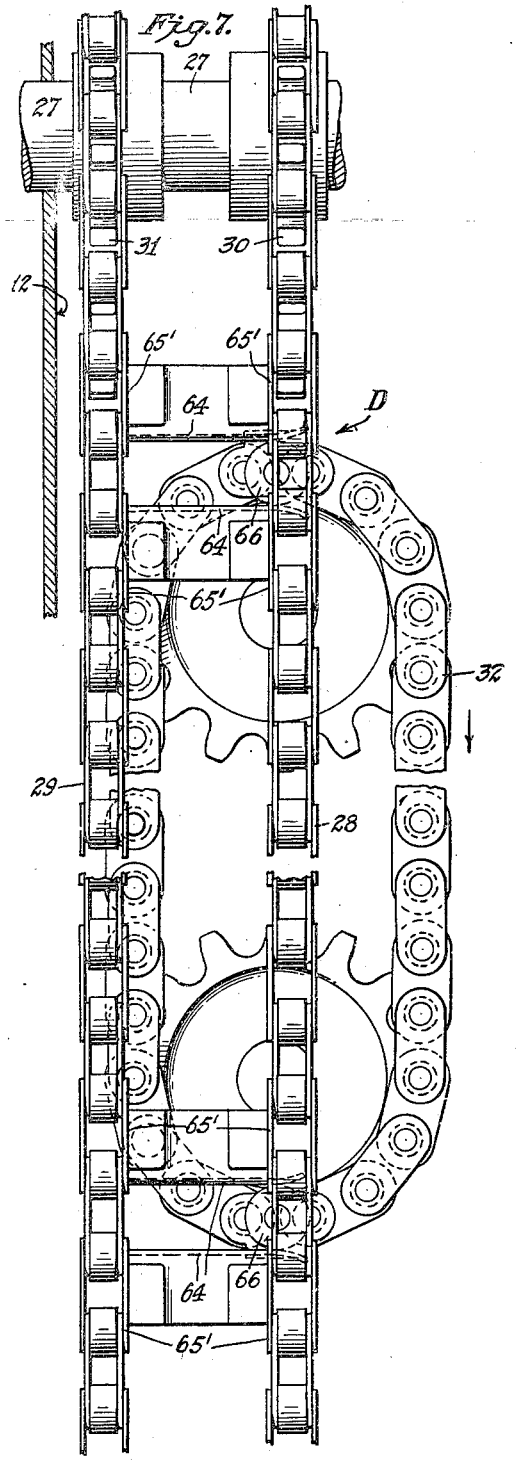
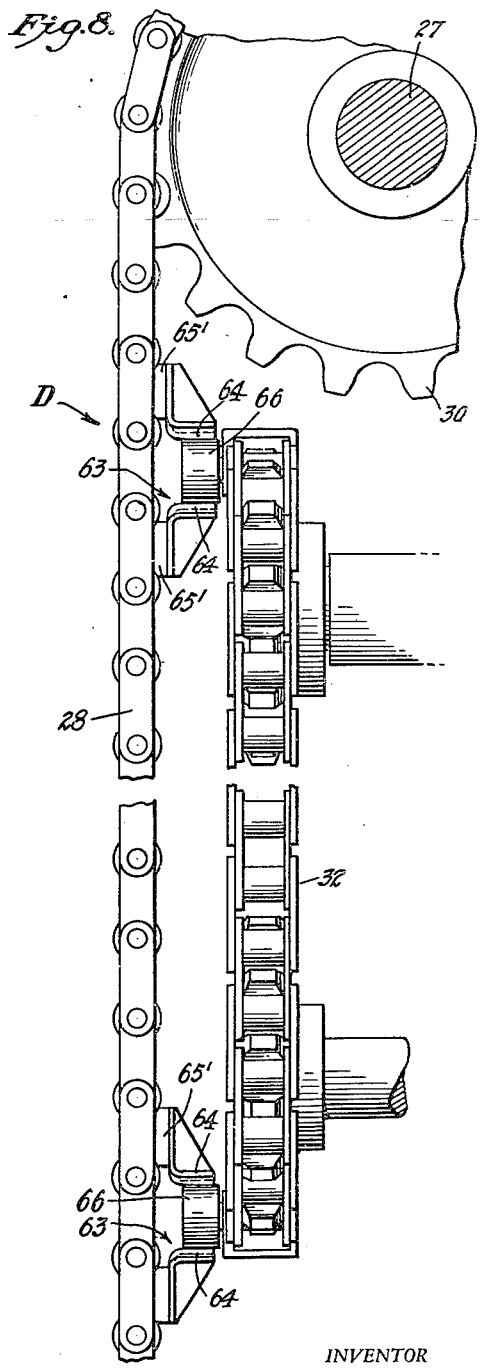
INVENTOR
Bjarne Henricksen
BY
Ramsey, Kent & Chisholm
ATTORNEYS

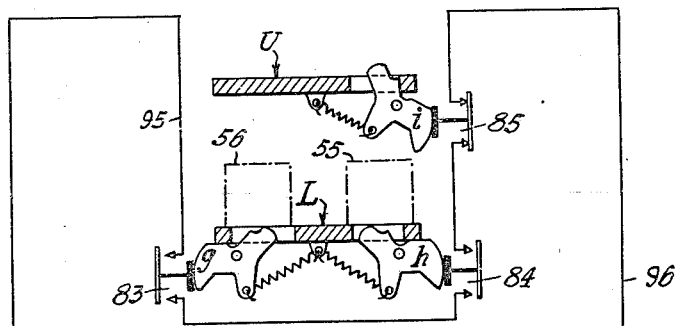
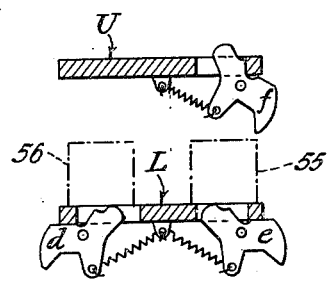
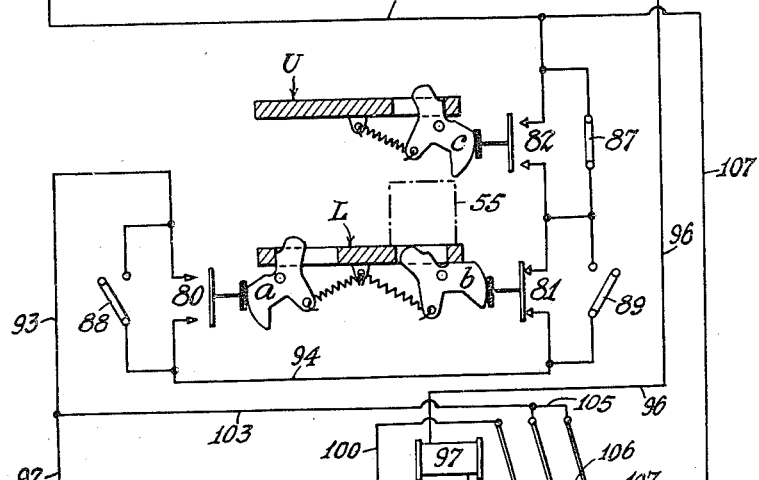
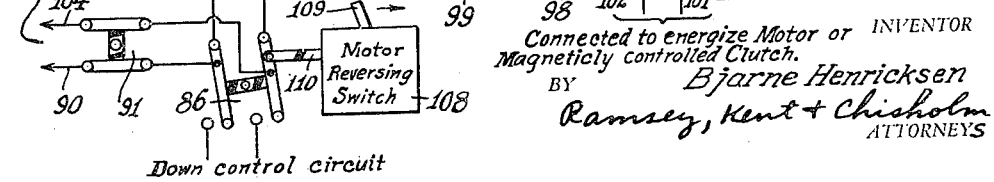

Patented Dec. 4, 1945

2,390,302

UNITED STATES PATENT OFFICE 2,390,302

CONVEYER

Bjarne Henricksen, Hudson County, N. J., assignor to Sedgwick Machine Works, Inc., Poughkeepsie, N. Y., a corporation of New York Application June 2, 1943, Serial No. 489,325

11 Claims. (Cl. 198—135)

This invention relates to conveyers. Certain features of the invention are applicable to vertical, horizontal, or inclined conveyers used to transport articles from location to location. For convenience I include loose material within the term "article." The particular embodiment of the invention which will be disclosed and discussed is an ammunition hoist, intended for conveying ammunition from the magazine deck of a ship to a gun deck and vice versa.

Among the objects of the invention are: the provision of an improved, inexpensive, and reliable "start-stop" conveyer for conveying articles from a loading station to a delivery station; the provision of improved means for causing a conveyer to automatically pause in station position for loading and unloading; the provision of conveyer drive means of a type adaptable for station dwells of different durations; the provision of control or safety means for automatically holding the conveyer in station position until unloaded at the delivery station and, if desired, loaded at the loading station; the provision of a conveyer adapted from both the mechanical and control standpoint for carrying different kinds of articles; and the provision of a conveyer of a type which lends itself to a large amount of prefabrication of standardized parts usable in a variety of installations.

Various additional objects of the invention will be apparent to skilled persons from a consideration of the following disclosure.

Fig. 1 of the drawings is a diagrammatic side elevation of an ammunition hoist embodying the present invention. The drive for the hoist is omitted for clarity.

Fig. 2 is a diagrammatic elevation looking from the rear of the hoist and showing the drive.

Fig. 3 is a partly diagrammatic front elevation, with portions in vertical section, showing primarily the loading and unloading stations and associated portions of the conveyer.

Fig. 4 is a partly diagrammatic vertical section showing primarily the loading and unloading stations and associated portions of the conveyer. The view is taken approximately on the line 4—4 of Fig. 3.

Fig. 5 is a horizontal section taken on the line 5—5 of Fig. 1.

Fig. 6 is a horizontal section taken approximately on the line 6—6 of Figs. 1 and 3.

Fig. 7 is a largely diagrammatic front elevation showing a fragment of the drive mechanism of the conveyer.

Fig. 8 is a largely diagrammatic side elevation of the fragment shown in Fig. 7.

Fig. 9 is a schematic diagram showing an electrical control system which may be used with the conveyer.

Fig. 10 is a schematic view showing a modification of the conveyer drive.

Fig. 11 is an illustrative speed-time curve of the hoist when using the drive of Figs. 2, 7 and 8, the drive being assumed to be in continuous operation.

Fig. 12 is an illustrative speed-time curve of the hoist when using a drive modified in the manner shown in Fig. 10, the drive being assumed to be in continuous operation.

Reference will first be had to Figs. 1 and 2. The hoist is inclosed within a casing that is preferably water tight. This casing includes a lower trunk section 11, an upper trunk section 12, and any desired number of intervening trunk sections 14 (one shown). These trunk sections are prefabricated from sheet steel and may be of pressed and welded construction. Integral with the trunk sections are flanges 15 arranged to be bolted together. The hoist shown extends from a magazine deck, through one intervening deck, and discharges just above a gun deck. By the use of additional sections 14, the height of the hoist may be increased as desired, and the hoist may pass through any desired number of intervening decks.

Closures 16 and 17 are provided at the loading and unloading stations, respectively. These closures are water tight and may be either removable covers or hinged doors. For convenience of reference, the "front" of the hoist is considered to be the side on which these closures are located.

The articles are hoisted, as will be described later, by endless link chains 20 and 21. These chains run over upper sprockets 22 and 24 respectively, and lower sprockets 25 and 26, respectively (see also Fig. 4). The lower sprockets are idlers mounted on a shaft 13 (Fig. 3) the journals of which are shiftable by screws 23, 23 to tighten the chains. The branches of the chains are guided by inwardly facing guide channels at 18, 18 and 19, 19 respectively (see also Figs. 4, 5 and 6). As shown in Fig. 1, the guide channels direct the hoisting and return branches of the chains toward each other, thereby diminishing the front to rear dimension of the conveyer casing.

The chain guide channels may be formed by angle irons welded or riveted to the inside of the trunk sections. However, space and weight may be saved by pressing the channels 18 and 19 directly into the side walls of the trunk sections, as shown in Figs. 5 and 6.

Upper sprockets 22 and 24 are driven by a shaft 27 which projects through the side wall of trunk section 12, as shown in Fig. 2. The drive for shaft 27 is designated as a whole by D. It includes two depending endless link chains 28 and 29 which pass over upper sprockets 30 and 31, respectively, and over lower sprockets 33 and 43, respectively. The upper sprockets are mounted on conveyer shaft 27; and chains 28 and 29 are driven in start-stop manner by another endless link chain 32, as will be described later.

The drive D is shown positioned beneath shaft 27 and alongside of the conveyer casing. It should be noted, however, that the drive may be placed in any radial position with respect to shaft 27. For example, the drive may be so located that chains 28 and 29 extend in a horizontal direction or in any inclined direction. This permits the drive to be placed in various positions, according to the space available in various installations. Preferably the drive D is inclosed in its own housing, which is not shown except for a fragment in Fig. 3. Such housing may be of water tight construction.

Reference will now be had to Figs. 3, 4, 5 and 6. The articles to be hoisted are received by shelves or flights which are carried by the hoisting chains 20 and 21, and which bridge the space between the chains. These flights are arranged in pairs, the pairs being at intervals along the chains, and each pair including an upper flight designated as a whole by U and a lower flight designated as a whole by L. The ends of the flights have depending portions which are affixed to two consecutive knuckle pins 34 of the hoisting chain, those particular pins being made extra long for that purpose. All of the knuckle pins of the hoisting chains are encircled by rollers 35 which roll in the guide grooves at 18, 18 and 19, 19.

The top faces of lower flights U have rectangular portions 36 and forwardly projecting tongues 37 and 38. The bottom faces of the lower flights have suitable reenforcing ribs, as shown at the top of Fig. 5 where the lower flight L is in inverted position on the return branches of the hoisting chains. The upper flights U are of irregular shape, having arcuate cut-outs at 39 and 40, and having forwardly projecting fingers 41, 42 and 44. The bottoms of the upper flights also have suitable reenforcing ribs.

At the loading station there are upper and lower loading tables on which are placed the articles that are to be hoisted. These tables are so subdivided and cut out that the flights U and L move through them and pick up the articles. These are shown in Figs. 3, 4 and 6. The lower loading table has a forward table surface 45, and a rear table surface 46. The upper loading table is built up from the sides of the lower table and is in the form of two forward supporting ledges and two rearward supporting ledges. The forward ledges are at 47 and 48, and the rearward ledges are at 49 and 50. The upper loading table may be at any suitable height above the lower loading table, and in some cases I place it at a higher level than is shown in the drawings.

The forward surface 45 of the lower table is divided by a depressible divider 51 (Figs. 4 and 6) which is pivoted at 52 beneath the table. Coil spring 54 biases this divider upwardly through a suitable slot in the table. This divider comes into play in loading 5" projectiles and the powder containers therefor. The space to the right of the divider is arranged to receive a 5" projectile 55 and guide it into the arcuate cut-out 40 in the upper flight U. The space to the left of the divider is arranged to receive the companion powder container 56 and guide it into the arcuate cut-out 39 in the upper flight. As the hoist advances, tongues 38 and 37 on the lower flight L move up against the bottoms of the projectile and powder container respectively and pick them up.

Fig. 5 shows how a box 57 of 40 mm. ammunition fits into the conveyer. In loading such a box it is placed on one end on the lower loading table and its weight depresses divider 51 flush with the table. The box is put in place in time to be picked up by the upper flight U. Fig. 5 also shows how a box 58 of 20 mm. ammunition fits into the conveyer. This box is placed on the upper loading table in time to be picked by the upper flight.

Each of the trunk sections is divided by a longitudinal partition plate 59. The flights hoist on one side of the plate and return on the other. Fig. 5 shows how this plate is pressed to form guide surfaces 60, 60 for box 57 and guide surfaces 61, 61 for box 58. The front walls of the trunk sections are pressed in such shape as to form companion guide surfaces 60', 60' and 61', 61'. The corners between surfaces 60' and 61' act as guides for the 5" projectile and its powder container. In bottom trunk section 11 the partition 59 terminates at a point permitting the flights to pass beneath it as the chains pass around the lower sprockets 25 and 26. In top trunk section 12 the flights may either pass over the top of partition 59 or through a hole 62 in it and of such shape as to permit the flights to pass through.

Reference will now be had to Figs. 2, 7 and 8, which show the conveyer drive D. Chains 28 and 29 drive the conveyer shaft 27. Arranged at intervals along these chains are internal cams, designated as a whole by 63, and each of which is formed by two cam sections 64, 64. These cams bridge the space between the chains and are attached to special connecting links 65' which form a part of the chains. The length of the cams is slightly less than the space between sprockets 30 and 31, so that the cams can be carried past the sprockets. Located between the branches of chains 28 and 29 is the endless link chain 32 which lies in a plane perpendicular to the planes of chains 28 and 29. Chain 32 passes over suitable upper and lower sprockets, the lower sprocket being driven from electric motor unit 65. Two cam rollers 66, 66 are carried by chain 32, being mounted on special knuckle pins of the chain. The motor unit includes suitable gearing and may include an electromagnetic clutch to disengage the hoist while the motor is left running. A suitable brake is included to automatically hold the hoist whenever the hoist is stopped. Such brake may be of the type shown in Henricksen U. S. Patent 2,042,937, June 2, 1936.

The arrangement is such that one roller 66 enters one cam 63 just before the other roller 66 leaves another cam 63. When the entering roller is in dead center position, the chains 28 and 29 (and also the hoisting chains 20 and 21) are at a standstill. During the next quarter turn of the sprockets of chain 32, the hoist is accelerated. Thereafter the hoist moves at a speed equal, or proportional, to the speed of chain 32 until the roller 66 starts to slow down on reaching the other sprocket of chain 32. It will be apparent that with chain 32 driven at constant speed, the hoist will advance in start-stop fashion, i. e., step-by-step. The drive is, of course, so coordinated with the hoist that the pauses occur when the hoisting flights are in station position for loading and unloading.

Instead of placing chain 32 between the branches of chains 28 and 29, I may place it outside of the branches. In such case the cams 63 are placed outside of chains 28 and 29 and face outwardly.

With the drive shown in Figs. 2, 7 and 8, the hoist will pause only momentarily at station position if chain 32 is kept in motion. However, longer dwells in station position may be obtained by substituting for chain 32, the chain 32' shown in Fig. 10. This passes over four sprockets 70, 71, 72 and 74, one of which is motor driven. The dwell lasts while a cam roller 66 is passing from dead center position on sprocket 70 to dead center position on sprocket 71. In using chain 32' it is, of course, necessary to increase the spacing of chains 28 and 29, with corresponding increase in the length of cams 63.

Using the drive of Figs. 2, 7 and 8, and keeping the chain 32 in uniform motion at full speed, the hoist will have a speed-time curve of the type shown in Fig. 11. As a roller 66 approaches the upper sprocket of chain 32, the hoist will be at full speed as shown by portion $s$ of the curve. As the roller passes around the sprocket quadrant to upper dead-center position, the hoist decelerates and momentarily comes to rest at $p$ (upper dead-center). As the roller passes around the succeeding sprocket quadrant, the hoist accelerates to full speed. Full speed continues, as shown by curve portion $t$, until the roller starts around the lower sprocket. The hoist then decelerates until the roller reaches lower dead-center position, when the hoist again pauses momentarily at $p$. As the roller passes around the succeeding quadrant of the lower sprocket, the hoist again accelerates and then moves at full speed as indicated by curve portion $u$.

Using the drive of Fig. 10 and keeping chain 32' in uniform motion at full speed, the hoist will have a speed-time curve of the type shown in Fig. 12. As a roller 66 passes around sprocket 70 to dead-center position the hoist decelerates from $s$ to zero. The dwell $d$ lasts while roller 66 is passing from dead-center position at the top of sprocket 70 to dead-center position at the top of sprocket 71. Acceleration to curve portion $t$ occurs as roller 66 passes around the quadrant of sprocket 71. This action is, of course, repeated at lower sprockets 74 and 72, as is illustrated by the second half of the curve of Fig. 12.

The control circuit is shown in purely schematic fashion in Fig. 9. This shows a pair U and L of the hoisting flights at the loading station, another pair at the unloading station, and one of the between station pairs. The flights are provided with spring retracted cams adapted to be shifted outwardly by the articles on the flights. The number and location of these cams will depend upon the types of articles to be conveyed. As illustrated, there are two cams on each lower flight L and one cam on each upper flight U. The cams for the three pairs of flights shown are designated by reference characters $a$ through $i$. Mounted on the wall of the hoist casing there are switches 80 through 85 which are actuated by the cams when the cams are shifted outwardly and the hoist is in station position.

Assume switches 86, 87, 88 and 89 to be in the position shown and that the hoist is being used to carry two articles on the lower flights L, e. g., to carry the projectile 55 and its powder container 56. At the loading station the projectile 55 is shown in place, with resultant closing of switch 81 by cam $b$. As soon as a powder container is loaded in place, switch 80 will be closed by cam $a$. Circuit will then be from conductor 90, switches 91 and 86, conductors 92 and 93, switch 80, conductor 94, switch 81, switch 87, conductor 95 to switch 83 which is shown held open by cam $g$ since the powder container 56 has not been unloaded at the loading station. As soon as the powder container 56 and the projectile 55 have been removed at the unloading station, the circuit will be completed from conductor 95, switches 83, 84 and 85, conductor 96, relay winding 97, conductors 98 and 99, and switches 86 and 91 to conductor 104 of the current source. Thus the relay picks up.

The relay is provided with contacts which cause the hoist to be set in motion either by energizing the motor or by energizing a magnetically controlled clutch mechanically interposed between the motor and the conveyer. For this purpose the relay may have two or three motor contacts, depending upon whether a two wire or a three wire current source is used. A two wire source and two motor contacts are shown. The circuit is from conductor 90, switches 91 and 86, conductors 92 and 103, relay contact 101, the motor or clutch, relay contact 102, conductors 100 and 99, and switches 86 and 91 to conductor 104 of the current source. The relay locks up through a holding circuit from current source conductor 90, switches 91 and 86, conductors 92, 103 and 105, relay contact 106, conductors 107 and 95, switches 83, 84, and 85 (which are now closed), conductor 96, relay winding 97, conductors 98 and 99, and switches 86 and 91 to current source conductor 104. Thus, the hoist is set in motion and is not stopped by the opening of switches 80, and 81 when the hoist advances from the loading station.

When a new load reaches the unloading station, the holding circuit is broken by the opening of one or more of the switches 83, 84 and 85. Thus, the action of the hoist drive is suspended until loading and unloading have again been completed. If the hoist be fully and quickly manned, the loading and unloading may be accomplished as the hoist is decelerating into station position. In this case the hoist will only pause in station position under the action of the mechanical stop-start drive D, and the electrical control system just described will not come into play. However, on failure or delay in loading or unloading, the electrical control system will hold the hoist in station position as long as need be.

In loading the hoist from complete empty condition it may be manually stopped in successive station positions by switch 91, until the first load reaches the unloading station. Switch 91 may then be left closed for automatic operation. To completely empty the hoist, switches 87, 88 and 89 are closed, whereupon the conveyer will advance as soon as unloaded at the unloading station. To set the hoist for carrying ammunition boxes on the upper flights U, switches 88 and 89 are closed and switch 87 opened.

The hoist is also operable in reverse direction to take ammunition from the gun deck to the magazine. For this purpose the drive motor is reversed by a reversing switch 108 which may be conventional and conventionally connected. When the handle 109 of the reversing switch is shifted, a mechanical connection 110 therefrom shifts switch 86. Switch 86 eliminates the control circuit just described and substitutes a "down" control circuit. The "down" circuit is the same as the "up" circuit except that the switches corresponding to switches 83, 84 and 85 are located at the lower station and the switches corresponding to switches 80, 81, 82, 87, 88 and 89 are located at the upper station. The cam actuated switches of the "down" circuit may be mounted alongside such switches of the "up" circuit, and the cams a through i be broad enough to actuate the switches of both circuits.

The invention has been disclosed by largely diagrammatic drawings. It will be understood that appropriate mechanical design is used to provide for assembly, accessibility of parts, replacement of parts, etc.

In compliance with the patent statutes, I have disclosed the best form in which I have contemplated applying my invention. It will be understood, however, that the disclosure is illustrative rather than limiting.

What I claim is:

1. A step-by-step conveyer comprising: loading and unloading stations, a flexible conveyer element extending between said stations, article-moving means attached at intervals to said flexible conveyer element to transport articles from station to station, and drive means to move said conveyer element step-by-step, the conveyer element pausing for loading and unloading of the articles at the stations; said drive means comprising an auxiliary start-stop flexible element, engageable means attached to said auxiliary flexible element, start-stop stations for said engageable means, a plurality of actuating means moving in unison and operative to successively engage and repeatedly move each of said engageable means from start-stop station to start-stop station, one of said actuating means being at all times engaged with one of said engageable means, and a driving connection from the auxiliary flexible element to the conveyer flexible element, the station-to-station movement of said engageable means establishing the step-by-step movement of the conveyer flexible element.

2. A conveyer as in claim 1 in which the flexible conveyer element and the auxiliary flexible elements each comprise endless link chains.

3. A conveyer as in claim 1 in which there are two flexible conveyer elements consisting of endless link chains in spaced relation, and the article-moving means bridges the space between the chains and is attached to each of them.

4. A step-by-step conveyer comprising: loading and unloading stations, a flexible conveyer element extending between said stations, article-moving means attached at intervals to said flexible conveyer element to transport articles from station to station, and drive means to move said conveyer element step-by-step, the conveyer element pausing for loading and unloading of the articles at the stations; said drive means comprising two auxiliary start-stop flexible elements consisting of endless link chains in spaced relation, engageable means bridging the space between said chains and attached to each of them, start-stop stations for said engageable means, actuating means to engage and repeatedly move each of said engageable means from start-stop station to start-stop station, and a driving connection from said chains to said conveyer flexible element, the station-to-station movement of said engageable means establishing the step-by-step movement of the conveyer flexible element.

5. A step-by-step conveyer comprising: loading and unloading stations, two flexible conveyer elements extending between said stations, said conveyer elements consisting of endless link chains in spaced relation, article-moving means attached at intervals to said flexible conveyer elements to transport articles from station to station, the article-moving means bridging the space between said chains and being attached to each of them, and drive means to move said conveyer elements step-by-step, the conveyer elements pausing for loading and unloading of the articles at the stations; said drive means comprising two auxiliary start-stop flexible elements, said auxiliary flexible element consisting of endless link chains in spaced relation, engageable means attached to said auxiliary flexible element, said engageable means bridging the space between the two chains constituting the auxiliary flexible elements and being attached to each of such chains, start-stop stations for said engageable means, actuating means to engage and repeatedly move each of said engageable means from start-stop station to start-stop station, and a driving connection from the auxiliary flexible elements to the conveyer flexible elements, the station-to-station movement of said engageable means establishing the step-by-step movement of the conveyer flexible elements.

6. A step-by-step conveyer comprising: loading and unloading stations, a flexible conveyer element extending between said stations, article-moving means attached at intervals to said flexible conveyer element to transport articles from station to station, and drive means to move said conveyer element step-by-step, the conveyer element pausing for loading and unloading of the articles at the stations; said drive means comprising two auxiliary start-stop flexible elements consisting of endless link chains in spaced relation, engageable means bridging the space between said chains and attached to each of them, start-stop stations for said engageable means, actuating means to engage and repeatedly move each of said engageable means from start-stop station to start-stop station, an additional endless link chain carrying said actuating means, and a driving connection from the auxiliary flexible elements to the conveyer flexible element, the station-to-station movement of said engageable means establishing the step-by-step movement of the conveyer flexible element.

7. A step-by-step conveyer comprising: loading and unloading stations, a flexible conveyer element extending between said stations, article-moving means attached at intervals to said flexible conveyer element to transport articles from station to station, and drive means to move said conveyer element step-by-step, the conveyer element pausing for loading and unloading of the articles at the stations; said drive means comprising two auxiliary start-stop flexible elements consisting of endless link chains in spaced relation, engageable means attached to said auxiliary flexible elements, such engageable means being cams which bridge the space between said chains and are attached to each of them, start-stop stations for said engageable means, actuating means to engage and repeatedly move each of said engageable means from start-stop station to start-stop station, said actuating means comprising a roller which enters and leaves the cam, and a driving connection from the auxiliary flexible elements to the conveyer flexible element, the station-to-station movement of said engageable means establishing the step-by-step movement of the conveyer flexible element.

8. A step-by-step conveyer comprising: loading and unloading stations, a flexible conveyer element extending between said stations, article-moving means attached at intervals to said flexible conveyer element to transport articles from station to station, and drive means to move said conveyer element step-by-step, the conveyer element pausing for loading and unloading of the articles at the stations; said drive means comprising two auxiliary start-stop flexible elements consisting of endless link chains located in spaced parallel planes, at least two engageable means attached to said auxiliary flexible elements, said engageable means being in the form of internal cams located at intervals along the chains constituting the auxiliary flexible elements and bridging the space between such chains, start-stop stations for said engageable means, at least two spaced actuating members which enter and leave the cams and repeatedly move each of said cams from start-stop station to start-stop station, one of said actuating members entering one cam before another of said actuating members leaves another cam whereby an actuating member is at all times in engagement with a cam, said actuating member being carried by means moving in a plane transverse to said parallel planes, and a driving connection from the auxiliary flexible elements to the conveyer flexible element, the station-to-station movement of said engageable means establishing the step-by-step movement of the conveyer flexible element.

9. A conveyer as in claim 1 in which there is means to automatically disable the conveyer when the load reaches the unloading station and keep it disabled until the load has been removed.

10. A conveyer as in claim 1 in which there is means to automatically disable the conveyer when it reaches station position and normally keep it disabled until it has been loaded at the loading station.

11. A conveyer as in claim 1 in which there is means controlled by the load to disable the conveyer in station position and normally keep it disabled until the load at the unloading position has been removed and a new load has been applied at the loading station.

BJARNE HENRICKSEN.